US009327628B2

(12) United States Patent
Subat

(10) Patent No.: US 9,327,628 B2
(45) Date of Patent: May 3, 2016

(54) AUTOMOBILE HEADREST

(71) Applicant: Bose Corporation, Framingham, MA (US)

(72) Inventor: Bradford Kyle Subat, Northborough, MA (US)

(73) Assignee: Bose Corporation, Framingham, MA (US)

(*) Notice: Subject to any disclaimer, the term of this patent is extended or adjusted under 35 U.S.C. 154(b) by 283 days.

(21) Appl. No.: 13/907,428

(22) Filed: May 31, 2013

(65) Prior Publication Data
US 2014/0355783 A1 Dec. 4, 2014

(51) Int. Cl.
B60N 2/48 (2006.01)
B60R 11/02 (2006.01)
H04R 5/02 (2006.01)
H04R 1/02 (2006.01)
H04R 1/40 (2006.01)
B60R 11/00 (2006.01)

(52) U.S. Cl.
CPC .......... *B60N 2/4876* (2013.01); *B60R 11/0217* (2013.01); *H04R 5/023* (2013.01); *B60R 2011/0017* (2013.01); *H04R 1/026* (2013.01); *H04R 1/403* (2013.01); *H04R 2499/13* (2013.01)

(58) Field of Classification Search
CPC ...... B60N 2/4876; B60N 2/48; B60N 2/4805; B60N 2/4808; B60N 2002/4894; B60N 2002/4897; B60R 11/0217; B60R 2011/0017; H04R 1/028; H04R 5/023; H04R 1/026; H04R 1/403; H04R 2499/13
USPC .............................. 381/86, 87, 335, 333, 301
See application file for complete search history.

(56) References Cited

U.S. PATENT DOCUMENTS

| 3,512,605 | A | * | 5/1970 | McCorkle ...................... 381/301 |
| 3,944,020 | A |   | 3/1976 | Brown |
| 4,027,112 | A |   | 5/1977 | Heppner et al. |
| 4,042,791 | A |   | 8/1977 | Wiseman |
| 4,156,117 | A |   | 5/1979 | Phillips |
| 4,329,544 | A |   | 5/1982 | Yamada |
| 4,331,841 | A | * | 5/1982 | Castagna ...................... 381/186 |

(Continued)

FOREIGN PATENT DOCUMENTS

DE 2349425 A1 4/1975
DE 4419079 C1 11/1995

(Continued)

OTHER PUBLICATIONS

International Search Report and Written Opinion dated Sep. 26, 2014 for International application No. PCT/US2014/038587.

*Primary Examiner* — Vivian Chin
*Assistant Examiner* — Jason R Kurr
(74) *Attorney, Agent, or Firm* — Bose Corporation

(57) ABSTRACT

An automobile headrest includes a main body portion having a front surface arranged to support a back of a head of a user. The main body portion includes first and second speakers which are disposed within the main body portion, and a core that is configured to support the speakers. The automobile headrest also includes a pair of support rods that are connected to the core. The core is configured such that at least a portion of the speakers is disposed directly behind the head of the user when the back of the user's head rests against the front surface of the main body portion and is centered relative to the main body portion. The core defines a portion of one or more acoustic chambers for the first and second speakers.

31 Claims, 11 Drawing Sheets

(56) References Cited

U.S. PATENT DOCUMENTS

| | | | |
|---|---|---|---|
| 4,490,842 A | 12/1984 | Watanabe | |
| 4,638,884 A * | 1/1987 | Lee | 181/141 |
| 4,694,497 A | 9/1987 | Kasai et al. | |
| 4,696,370 A | 9/1987 | Tokumo et al. | |
| 4,758,047 A | 7/1988 | Hennington | |
| 4,797,934 A | 1/1989 | Hufnagel | |
| 4,977,600 A | 12/1990 | Ziegler | |
| 5,097,821 A | 3/1992 | Eakin | |
| 5,143,055 A | 9/1992 | Eakin | |
| 5,193,118 A | 3/1993 | Latham-Brown et al. | |
| 5,287,412 A | 2/1994 | Etzel et al. | |
| 5,305,386 A | 4/1994 | Yamato | |
| 5,325,435 A | 6/1994 | Date et al. | |
| 5,368,359 A | 11/1994 | Eakin | |
| 5,370,446 A | 12/1994 | Bancod | |
| 5,387,026 A * | 2/1995 | Matsuhashi et al. | 297/217.4 |
| 5,398,992 A | 3/1995 | Daniels | |
| 5,459,790 A | 10/1995 | Scofield et al. | |
| 5,661,812 A | 8/1997 | Scofield et al. | |
| 5,687,230 A | 11/1997 | Olausson et al. | |
| 5,687,246 A | 11/1997 | Lancon | |
| 5,710,818 A | 1/1998 | Yamato et al. | |
| 5,748,748 A | 5/1998 | Fischer et al. | |
| 5,784,473 A | 7/1998 | Ferren | |
| 5,841,879 A | 11/1998 | Scofield et al. | |
| 5,883,961 A | 3/1999 | House et al. | |
| 5,887,071 A | 3/1999 | House | |
| 5,889,875 A | 3/1999 | Caron et al. | |
| 5,949,894 A | 9/1999 | Nelson et al. | |
| 5,997,091 A | 12/1999 | Rech et al. | |
| 6,021,208 A | 2/2000 | Kin-Lung | |
| 6,089,663 A | 7/2000 | Hill | |
| 6,094,496 A * | 7/2000 | Stowers, Sr. | 381/362 |
| 6,144,747 A | 11/2000 | Scofield et al. | |
| 6,217,118 B1 | 4/2001 | Heilig | |
| 6,402,238 B1 | 6/2002 | Bigi et al. | |
| 6,478,108 B1 | 11/2002 | Linhard et al. | |
| 6,498,856 B1 | 12/2002 | Itabashi et al. | |
| 6,681,024 B2 | 1/2004 | Klein et al. | |
| 6,718,039 B1 | 4/2004 | Klayman et al. | |
| 6,744,898 B1 | 6/2004 | Hirano | |
| 6,812,900 B2 | 11/2004 | Ghabra et al. | |
| 6,853,732 B2 | 2/2005 | Scofield | |
| 6,904,157 B2 | 6/2005 | Shima | |
| 6,965,787 B2 | 11/2005 | Kindo et al. | |
| 6,975,737 B2 | 12/2005 | Hirao | |
| 6,991,289 B2 | 1/2006 | House | |
| 7,043,031 B2 | 5/2006 | Klayman et al. | |
| 7,088,840 B2 | 8/2006 | Maekawa | |
| 7,092,531 B2 | 8/2006 | Enya et al. | |
| 7,130,440 B2 | 10/2006 | Maekawa et al. | |
| 7,159,938 B1 | 1/2007 | Shiraishi | |
| 7,162,048 B2 | 1/2007 | Shima | |
| 7,268,677 B2 | 9/2007 | Enya et al. | |
| 7,284,637 B2 | 10/2007 | Abe et al. | |
| 7,366,607 B2 | 4/2008 | Nakaishi et al. | |
| 7,367,886 B2 | 5/2008 | Loose et al. | |
| 7,386,139 B2 | 6/2008 | Hashimoto et al. | |
| 7,440,578 B2 | 10/2008 | Arai et al. | |
| 7,508,952 B2 | 3/2009 | Hofmann et al. | |
| 7,555,130 B2 | 6/2009 | Klayman et al. | |
| 7,561,706 B2 | 7/2009 | Holmi et al. | |
| 7,676,047 B2 | 3/2010 | Aylward et al. | |
| 7,684,577 B2 | 3/2010 | Arai et al. | |
| 7,688,992 B2 | 3/2010 | Aylward et al. | |
| 8,019,454 B2 | 9/2011 | Haulick et al. | |
| 8,031,879 B2 | 10/2011 | Eid et al. | |
| 8,045,736 B2 | 10/2011 | Shibata et al. | |
| 8,073,156 B2 | 12/2011 | Hutt et al. | |
| 8,077,873 B2 | 12/2011 | Shridhar et al. | |
| 8,090,116 B2 | 1/2012 | Holmi et al. | |
| 8,103,017 B2 | 1/2012 | Nakagaki | |
| 8,121,319 B2 | 2/2012 | Azizi et al. | |
| 8,121,336 B2 | 2/2012 | Hutt et al. | |
| 8,126,159 B2 | 2/2012 | Goose et al. | |
| 8,130,987 B2 * | 3/2012 | Kaneda et al. | 381/302 |
| 8,160,267 B2 | 4/2012 | Sakamoto | |
| 8,199,940 B2 | 6/2012 | Yokota | |
| 8,212,659 B2 | 7/2012 | Iwamoto | |
| 8,213,646 B2 | 7/2012 | Matsumoto et al. | |
| 8,238,578 B2 | 8/2012 | Aylward | |
| 8,315,401 B2 | 11/2012 | Hayakawa et al. | |
| 8,325,936 B2 | 12/2012 | Eichfeld et al. | |
| 8,325,938 B2 | 12/2012 | Yokota | |
| 2002/0031234 A1 | 3/2002 | Wenger et al. | |
| 2003/0141967 A1 | 7/2003 | Aichi et al. | |
| 2006/0222182 A1 | 10/2006 | Nakaishi et al. | |
| 2006/0269068 A1 | 11/2006 | Yokota | |
| 2007/0133949 A1 | 6/2007 | Tatsuta et al. | |
| 2007/0195964 A1 | 8/2007 | Yokota | |
| 2008/0037794 A1 | 2/2008 | Sugawara et al. | |
| 2008/0260174 A1 | 10/2008 | Yokota | |
| 2008/0273722 A1 * | 11/2008 | Aylward et al. | 381/302 |
| 2009/0214055 A1 | 8/2009 | Sawashi | |
| 2010/0148550 A1 | 6/2010 | Kidd | |
| 2010/0320819 A1 | 12/2010 | Cohen et al. | |
| 2011/0235832 A1 | 9/2011 | Riopel | |
| 2011/0286614 A1 | 11/2011 | Hess | |
| 2012/0008806 A1 | 1/2012 | Hess | |
| 2014/0270322 A1 * | 9/2014 | Silverstein | 381/391 |

FOREIGN PATENT DOCUMENTS

| | | |
|---|---|---|
| DE | 19513769 A1 | 10/1996 |
| EP | 0368291 A1 | 5/1990 |
| EP | 0993230 A2 | 4/2000 |
| EP | 1077156 A1 | 2/2001 |
| EP | 1083094 A1 | 3/2001 |
| EP | 1137319 A2 | 9/2001 |
| EP | 1372356 A1 | 12/2003 |
| EP | 2172058 A1 | 4/2010 |
| EP | 2179595 A1 | 4/2010 |
| FR | 1259088 A | 4/1961 |
| FR | 2646330 A1 | 11/1990 |
| FR | 2696388 A1 | 4/1994 |
| FR | 2768099 A1 | 3/1999 |
| FR | 2768100 A1 | 3/1999 |
| FR | 2779313 A1 | 12/1999 |
| GB | 2224178 A | 4/1990 |
| JP | 5647197 A | 4/1981 |
| JP | 59174090 A | 10/1984 |
| JP | 60183900 A | 9/1985 |
| JP | 61-188243 A | 8/1986 |
| JP | S62100060 A | 5/1987 |
| JP | 6478600 A | 3/1989 |
| JP | 01136843 | 5/1989 |
| JP | 01136844 | 5/1989 |
| JP | 01202100 A | 8/1989 |
| JP | 0385095 | 4/1991 |
| JP | 0385096 | 4/1991 |
| JP | 03132198 A | 6/1991 |
| JP | 04137897 B2 | 5/1992 |
| JP | 04325338 B2 | 11/1992 |
| JP | 0479520 | 12/1992 |
| JP | 05137630 B2 | 6/1993 |
| JP | 05-191342 B2 | 7/1993 |
| JP | 05-344584 A | 12/1993 |
| JP | 06161466 A | 6/1994 |
| JP | 0847078 A | 2/1995 |
| JP | 0775578 B2 | 8/1995 |
| JP | 07227332 A | 8/1995 |
| JP | 07-264689 A | 10/1995 |
| JP | 07281675 A | 10/1995 |
| JP | 07288885 A | 10/1995 |
| JP | 08314474 A | 11/1995 |
| JP | 09252499 A | 9/1997 |
| JP | 10143166 A | 5/1998 |
| JP | 10-194049 A | 7/1998 |
| JP | 11342799 A | 12/1999 |
| JP | 11355896 A | 12/1999 |
| JP | 3042731 B2 | 5/2000 |
| JP | 2000270390 A | 9/2000 |
| JP | 2001095646 A | 4/2001 |
| JP | 3232521 B2 | 11/2001 |

(56) References Cited

FOREIGN PATENT DOCUMENTS

| | | |
|---|---|---|
| JP | 3238965 B2 | 12/2001 |
| JP | 3256560 B2 | 2/2002 |
| JP | 2002191469 A | 7/2002 |
| JP | 2004016522 A | 1/2004 |
| JP | 2004016711 A | 1/2004 |
| JP | 2004191871 A | 7/2004 |
| JP | 2004226189 A | 8/2004 |
| JP | 2005027019 A | 1/2005 |
| JP | 2005150954 A | 6/2005 |
| JP | 2005159914 A | 6/2005 |
| JP | 2005167378 A | 6/2005 |
| JP | 2005167379 A | 6/2005 |
| JP | 3709136 B2 | 10/2005 |
| JP | 2006080886 A | 3/2006 |
| JP | 3790042 B2 | 6/2006 |
| JP | 2006222686 A | 8/2006 |
| JP | 2006-270302 A | 10/2006 |
| JP | 3831984 B2 | 10/2006 |
| JP | 2006273164 A | 10/2006 |
| JP | 2006279864 A | 10/2006 |
| JP | 2007003994 A | 1/2007 |
| JP | 2007053622 A | 3/2007 |
| JP | 4029776 B2 | 1/2008 |
| JP | 2008252686 A | 10/2008 |
| JP | 2009017094 A | 1/2009 |
| JP | 2009018600 A | 1/2009 |
| JP | 4338028 B2 | 9/2009 |
| JP | 4487627 B2 | 6/2010 |
| JP | 4692803 B2 | 6/2011 |
| JP | 4735920 B2 | 7/2011 |
| JP | 4756327 B2 | 8/2011 |
| JP | 4778272 B2 | 9/2011 |
| JP | 5042664 B2 | 10/2012 |
| WO | 93/01951 A1 | 2/1993 |
| WO | 94/15815 A1 | 7/1994 |
| WO | 2004/056607 A1 | 7/2004 |
| WO | 2009/012500 A2 | 1/2009 |
| WO | 2009-012501 A2 | 1/2009 |
| WO | 2009012497 A1 | 1/2009 |
| WO | 2009012499 A1 | 1/2009 |
| WO | 2009/113319 A1 | 9/2009 |
| WO | 2012/013743 A1 | 2/2012 |

\* cited by examiner

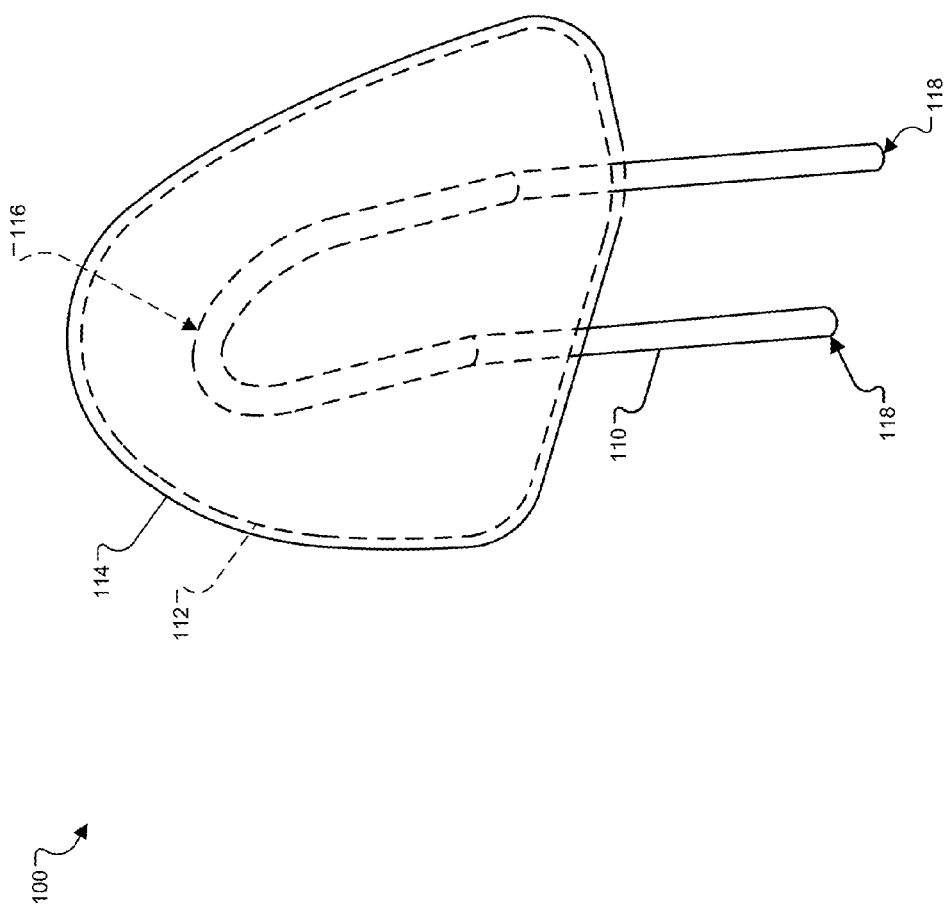

AUTOMOBILE HEADREST

BACKGROUND

This disclosure relates to an automobile headrest.

Referring to FIG. 1, a typical construction for a car headrest 100 includes a support rod 110 (e.g., a metal rod) that is partially embedded in a foam pad 112, which is then wrapped with a cover layer 114 (e.g., fabric). The support rod 110 includes a U-shaped portion 116 that is embedded in the foam pad 112 and which serves as the main structural element of the headrest 100. Free end portions 118 of the support rod 110 extend outwardly from the foam pad 112 and serve as features for releasably attaching the headrest 110 to a seat back. In such configurations, the single support rod 110 desirably serves as a simple, inexpensive solution for providing both structural support as well as an attachment means for the headrest 100.

In some cases, speakers have been integrated into car headrests often by attaching the speakers to the U-shaped support bar. U.S. Pat. No. 8,130,987 to Kaneda et al. is an example of such a headrest in which speakers are mounted to the left and right sides of a pad and are coupled to a U-shaped support rod via a stay.

FIGS. 2A and 2B illustrate another example of a headrest 200 that incorporates speakers 202. Referring to FIG. 2A, the speakers 202 are positioned to lay in a region that is directly behind the user's head (i.e., as opposed to the being located on the left and right sides of the U-shaped support rod 210) and to fire outwardly, in diverging directions on either side of the headrest 200. In this configuration, the U-shaped support rod 210 has additional curvature and is positioned closer to the top of the headrest 200 in order to accommodate the speakers 202 in the region that is to be directly behind the user's head.

A small plastic enclosure 211 is attached to each speaker for forming an acoustic enclosure. Each of those sub-assemblies then gets screwed into a sheet metal cage 212 which is secured to the U-shaped support rod 210. Then a molded piece of foam is placed around that assembly, which is subsequently covered with a cover material 214 (e.g., fabric or leather), and there are a pair of plastic covers 216 and grille pieces 218, for covering the speakers, that are off on either side of the headrest 210, as shown in FIG. 2B.

SUMMARY

This disclosure is based, in part, on the realization that a headrest can be provided with a main structural member that eliminates the U-shaped support member found in many prior art headrest configurations, and which also receives and supports speakers. The accommodation of the speakers in the main structural member itself can help to reduce the need for additional assemblies and/or additional connecting components for securing the speakers to the main structural member. The elimination of the U-shaped support member can allow for greater freedom for the positioning of speakers, particularly in the region of the headrest that is configured to lay directly behind a user's head. That is, such configurations can allow for speakers to be positioned directly behind the head of a user of the headrest without the limitations imposed by a U-shaped support bar and without sacrificing structural support of the headrest. Such configurations can be particularly benefit for compact cars in which space is limited and there is high pressure for low cost manufacturing solutions.

In one aspect, an automobile headrest includes a main body portion having a front surface arranged to support a back of a head of a user. The main body portion includes first and second speakers which are disposed within the main body portion, and a core that is configured to support the speakers. The automobile headrest also includes a pair of support rods that are connected to the core. The core is configured such that at least a portion of the speakers is disposed directly behind the head of the user when the back of the user's head rests against the front surface of the main body portion and is centered relative to the main body portion. The core defines a portion of one or more acoustic chambers for the first and second speakers.

Implementations may include one of the following features, or any combination thereof.

In some implementations, the speakers are each configured to radiate acoustic energy along a respective central axis. The speakers are positioned such that their central axes do not cross a vertical plane at any point forward of the front surface of the main body portion. The vertical plane bisects the headrest and extends through the front surface and an opposing, back surface of the main body portion.

In certain implementations, the speakers are arranged so as to direct acoustic energy in diverging directions, relative to each other, forward of the front surface.

In some implementations, the speakers are positioned such that their central axes diverge at respective angles of about 5 degrees to about 60 degrees (e.g., about 45 degrees) relative to a vertical plane. The vertical plane bisects the headrest and extends through the front surface and an opposing, back surface of the main body portion.

In certain implementations, the speakers are each configured to radiate acoustic energy along a respective central axis, and wherein the speakers are positioned such that their central axes are substantially parallel.

In some implementations, the speakers are arranged adjacent each other between right and left sides of the main body portion, and wherein the minimum spacing between the speakers is less than 6.5 inches (e.g., less than 5.2 inches).

In certain implementations, the speakers are arranged adjacent each other between right and left sides of the main body portion, and wherein the main body portion has a width, measured between the left and right sides, of about 7.9 inches to about 11.4 inches (e.g., 8.5 inches to 9.6 inches).

In some implementations, the core is configured to support the speakers such that the speakers are at least partially disposed between a pair of longitudinal axes about which the support rods are arranged.

In certain implementations, the longitudinal axes of the support rods are spaced about 4.1 inches to about 6.0 inches apart.

In some implementations, the core defines a plurality of ribs.

In certain implementations, the speakers are positioned symmetrically about a vertical plane that bisects the headrest and extends through the front surface and an opposing, back surface of the main body portion.

In some implementations, the core is a one piece (i.e., unitary) molded plastic part.

In certain implementations, the main body portion includes a back cover that is connected to the core. The back cover and the core together define the one or more acoustic chambers.

In some implementations, the one or more acoustic chambers include a plurality of acoustic chambers, and the main body portion and the back cover together define the plurality of acoustic chambers.

In certain implementations, the back cover is welded to the core.

In some implementations, the back cover is a one piece (i.e., unitary) molded plastic part.

In certain implementations, the main body portion includes a front cover which defines grille openings for the speakers.

In some implementations, the front cover defines a reaction plate that is configured to support a user's head and minimize hyper rotation of the user's head and neck in the event of relatively sudden automobile acceleration.

In certain implementations, the reaction plate has a Rockwell hardness (R scale) of about 80 to about 121.

In some implementations, at least a portion of the speakers is disposed behind the reaction plate.

In certain implementations, at least some of grille openings are formed in the reaction plate.

In some implementations, the front cover is a one piece molded plastic part.

In certain implementations, the core defines a pair of sockets each for receiving a distal end portion of one of the support rods.

In another aspect, an automobile headrest includes a main body portion having a front surface arranged to support a back of a head of a user. The main body portion includes a core assembly including: first and second speakers disposed within the main body portion; and a core configured to support the speakers; a back cover connected to the core; and a front cover connected to the core and defining grille openings. The headrest also includes a pair of support rods connected to the core. The core is configured such that at least a portion of the speakers is disposed directly behind the head of the user when the back of the user's head rests against the front surface of the main body portion and is centered relative to the main body portion. The back cover and the core together define one or more acoustic chambers for the speakers.

Implementations may include one of the above and/or below features, or any combination thereof.

In some implementations, the back cover defines a contour of a back surface, opposite the front surface, of the main body portion.

In certain implementations, the front cover defines a contour of the front surface of the main body portion.

In some implementations, the headrest includes a cushion layer enveloping the core assembly, and a cover layer enveloping the cushion layer.

In certain implementations, the cushion layer includes a first region of relatively higher acoustic dampening, and a second region of relatively lower acoustic damping disposed in a region of the grille openings.

According to another aspect, an automobile headrest includes a unitary core that defines a pair of sockets each for receiving a distal end portion of a support rod. The core is configured to support a pair of speakers such that the speakers are at least partially disposed between a pair of longitudinal axes about which the sockets are arranged. The core at least partially defines one or more acoustic chambers for the speakers.

Implementations may include one of the above and/or below features, or any combination thereof.

In some implementations, the core is main structural component of the main body portion.

BRIEF DESCRIPTION OF THE DRAWINGS

FIG. 1 is a perspective view of a prior art headrest.

DETAILED DESCRIPTION

Figure 2A:
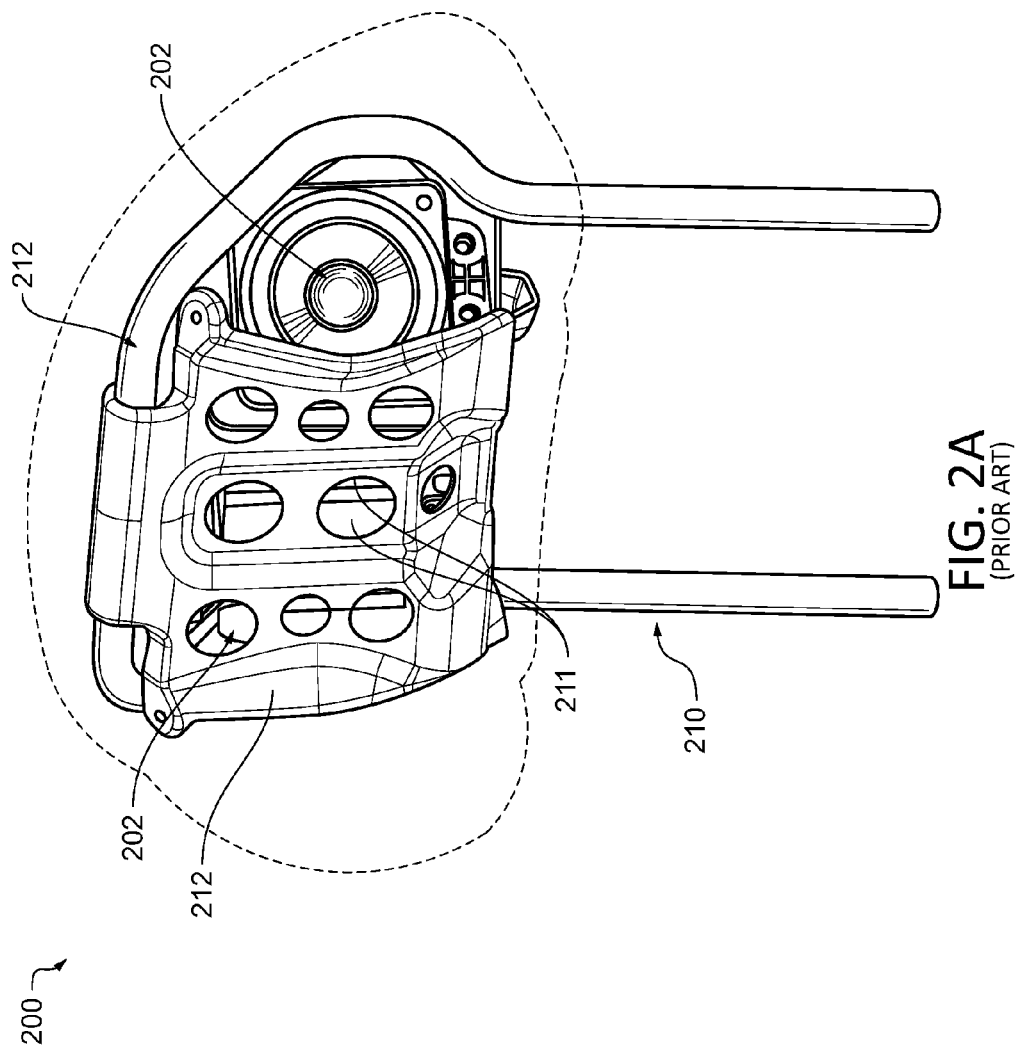
FIG. 2A is a perspective view of a prior art headrest having speakers, showing internal components of the headrest.
Figure 2B:
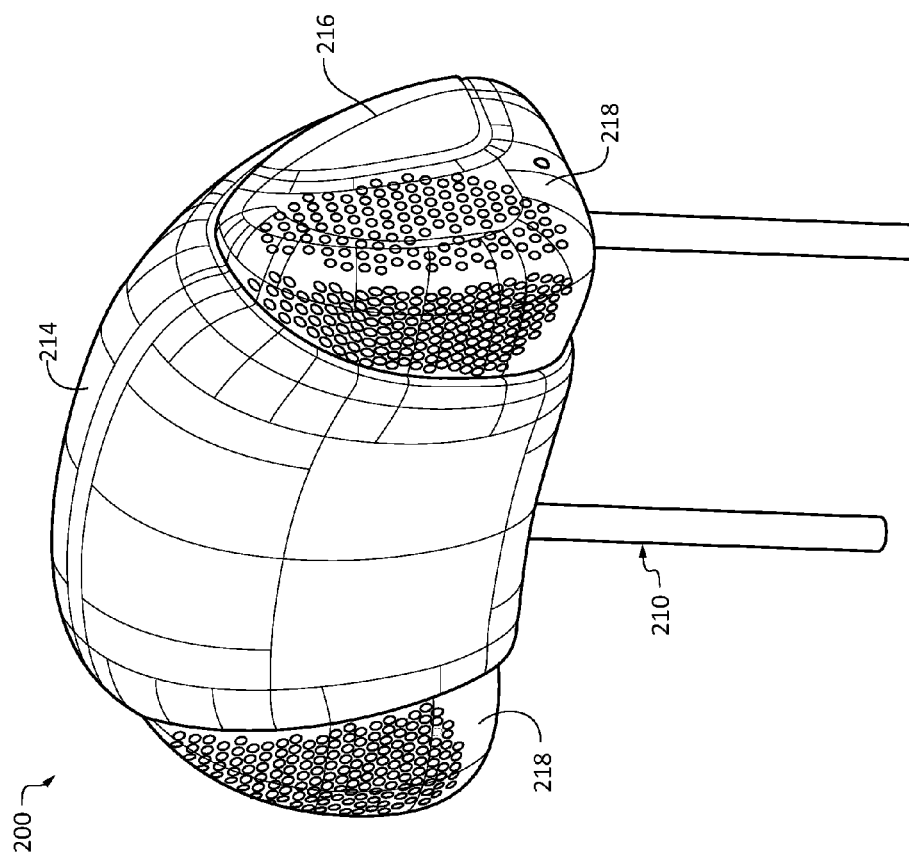
FIG. 2B is a perspective view of a prior art headrest having speakers, showing external components of the headrest.
Figure 3A:
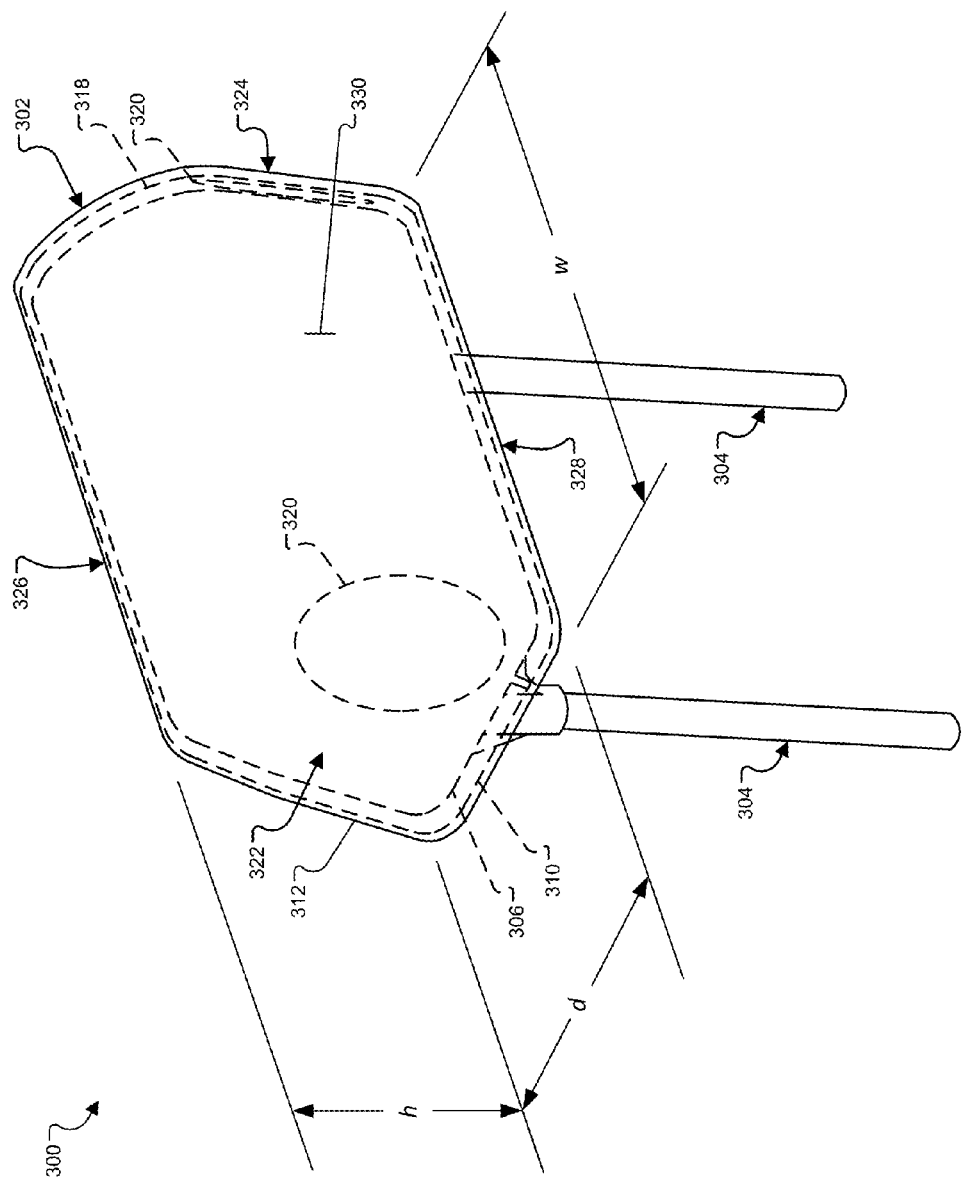
FIGS. 3A and 3B are front and back perspective views, respectively, of an automobile headrest.
Figure 3B:
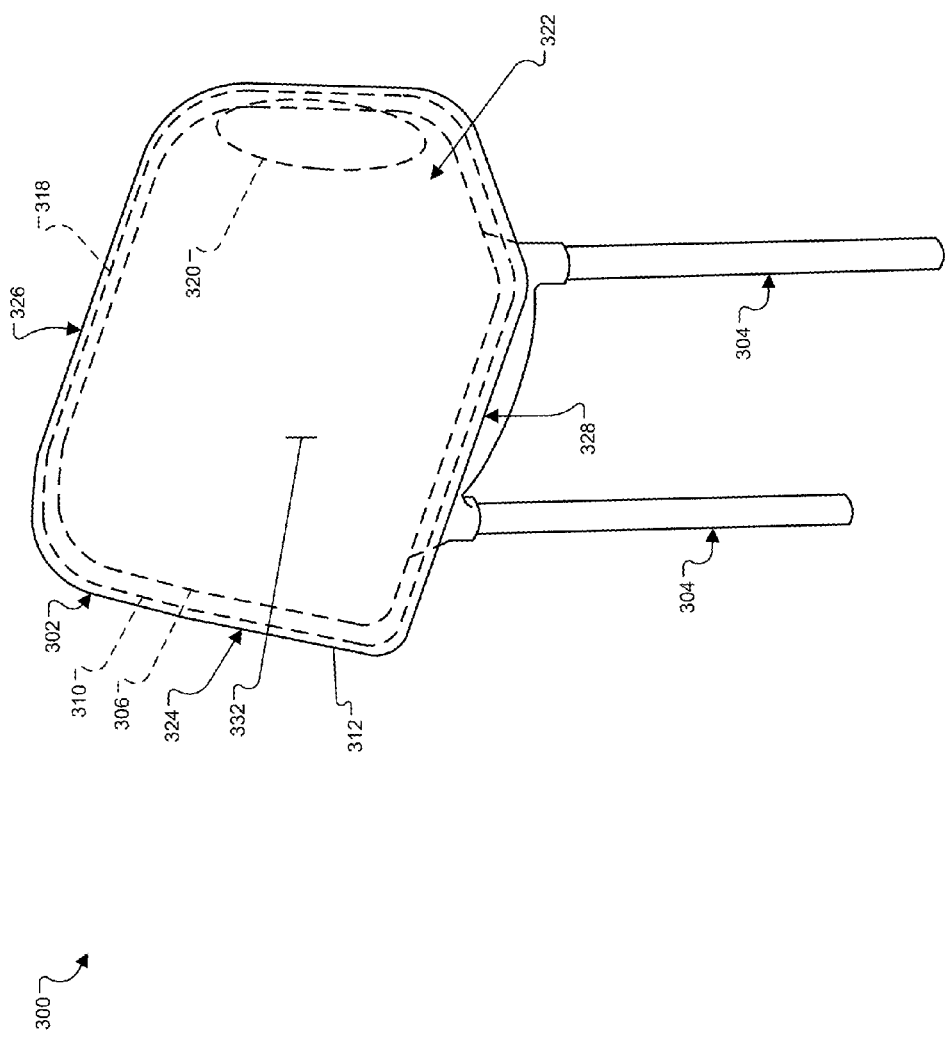

Referring to FIGS. 3A and 3B, an exemplary automobile headrest 300 includes a main body portion 302 for supporting the back of a user's head; and one or more (two shown) support rods 304 for detachably mounting the headrest 300 to a seat back.

Figure 5A:
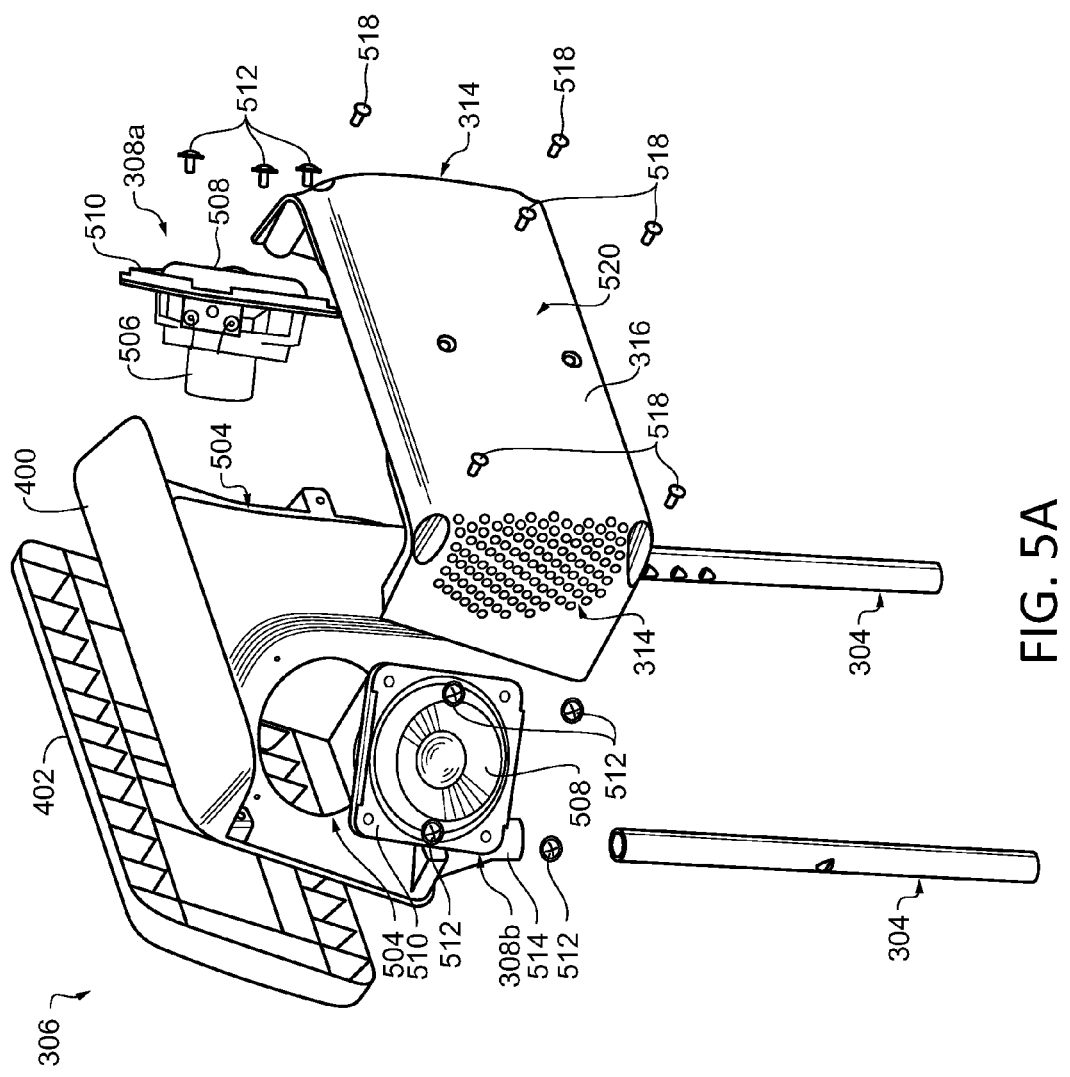
FIGS. 5A and 5B are front and back exploded perspective views, respectively, of the core assembly of FIGS. 4A and 4B.
Figure 5B:
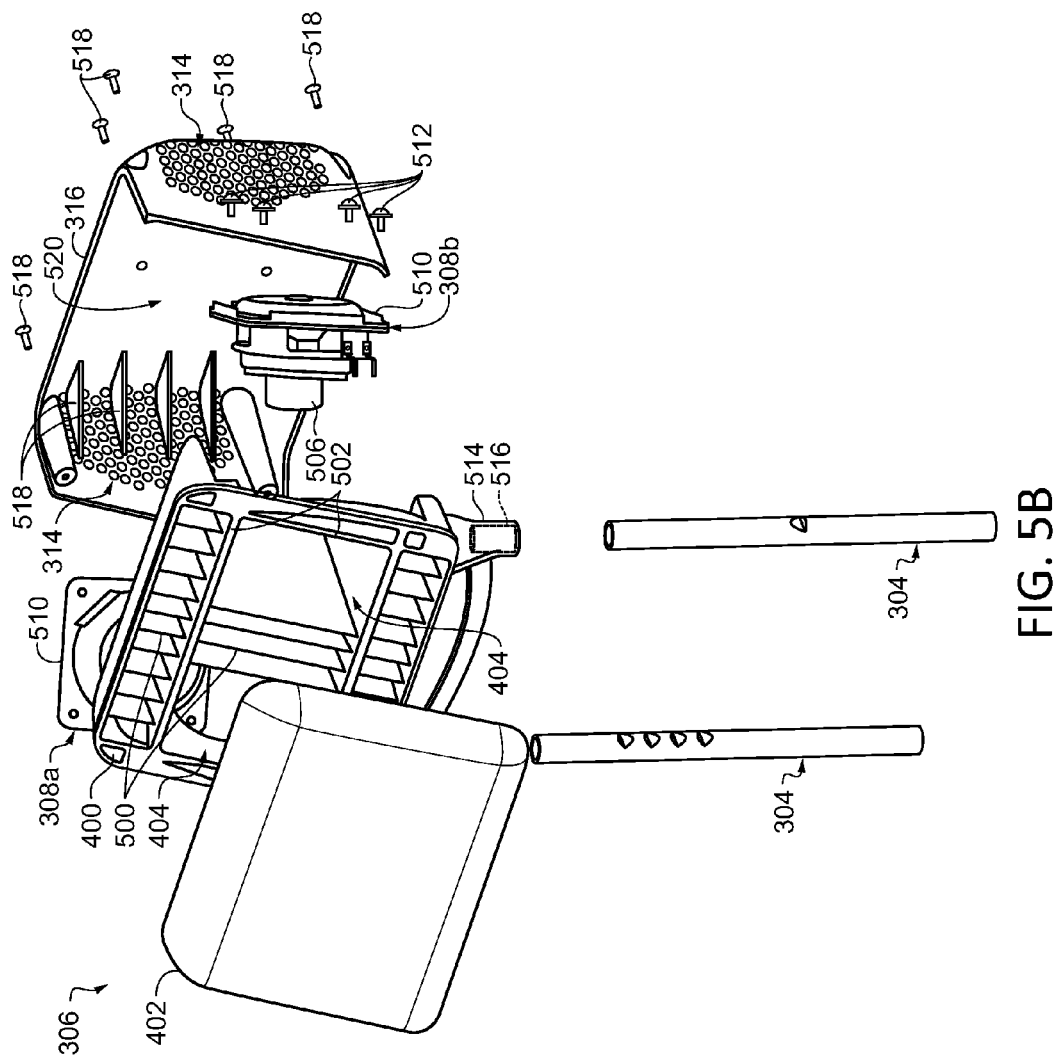

The main body portion 302 includes a core assembly 306 which houses a plurality of speakers (e.g., left and right speakers 308a, 308b, referenced collectively as "308" (see, e.g., FIGS. 5A and 5B). The core assembly 306 is enveloped with a layer of foam (a/k/a cushion layer 310) which is then enveloped with a cover layer 312. In the completed assembly, the speakers 308 are entirely enclosed within the main body portion 302.

The cushion layer 310 can include sheet form foam that is cut to shape and then wrapped around the core assembly 306. It may be desirable to utilize a cushion material that provides high energy absorption for cushioning. For example, the cushion layer 310 can comprise a material having an energy absorption that meets automotive head restraint safety requirements; in one case safety requirements dictate that for a spherical mass of 6.8 kg traveling at 24.1 km/h, the 3 ms deceleration must not exceed 80 gs. It may also be desirable to utilize a cushion material (e.g., a foam material) that provides for high acoustic dampening to help acoustically isolate the speakers 308. The cover layer 312 (e.g., a fabric cover) can then be pulled over the cushion layer 310 to hold the cushion layer 310 tightly against the core assembly 306 such that the cover layer 312 and cushion layer 310 assume the contours of the core assembly 306.

Portions of the cushion layer 310 in front of grille openings 314 (FIG. 4A) in a front cover 316 (FIG. 4A) can have a different acoustic property than the remainder of the cushion layer 310. For example, the cushion layer 310 may consist of a plurality of foam pieces that are glued together. In one example, the cushion layer includes a first foam portion 318 formed of a first foam material that provides relatively high energy absorption and relatively high acoustic absorption. The first foam portion 318 can include one or more voids in the regions that are to overlie the grille openings 314. One or more second foam portions 320 formed of a second foam material having relatively high acoustic transparency can be secured to the first foam portion 318 to fill and/or cover the void regions. Alternatively, the cushion layer 310 could be a molded part that is formed to fit over the core assembly 306.

The cover layer 312 can, for example, be a type of fabric capable of being drawn around the core assembly 306 and cushion layer 310.

In certain implementations, the main body portion 302 can have a width w of about 7.9 inches to about 11.4 inches (e.g., 8.5 inches to 9.6 inches); a height h of about 5.1 inches to about 9.1 inches (e.g., 7.5 inches to 9.1 inches); and a depth d of about 4.3 inches to about 7.5 inches (e.g., 4.9 inches to 7.5 inches).

The width w is the dimension measured at the widest point between the right side 322 of the main body portion 302 and the left side 324 of the main body portion 302. The right side 322 of the main body portion 302 is the side that is positioned toward the user's right hand side during normal, intended use. The left side 324 of the main body portion 302 is the side that is positioned toward the user's left hand side during normal, intended use.

The height h is the dimension measured at the widest point between the top 326 of the main body portion 302 and the bottom 328 of the main body portion 302. References to top and bottom are made with respect to the orientation of the headrest 300 during normal, intended use.

The depth d is the dimension measured at the widest point between the front and back surfaces of the main body portion 302. The front surface 330 of the main body portion 302 is the surface against which the back of a user's head rests during normal, intended use. The back (rear) surface 332 of the main body portion 302 is the surface opposite the front surface. The support rods 304 can be metal rods. One or more of the rods 304 can include a hollow center to serve as a conduit to provide wires into the core assembly 306 for driving the speakers 308.

Figure 4A:
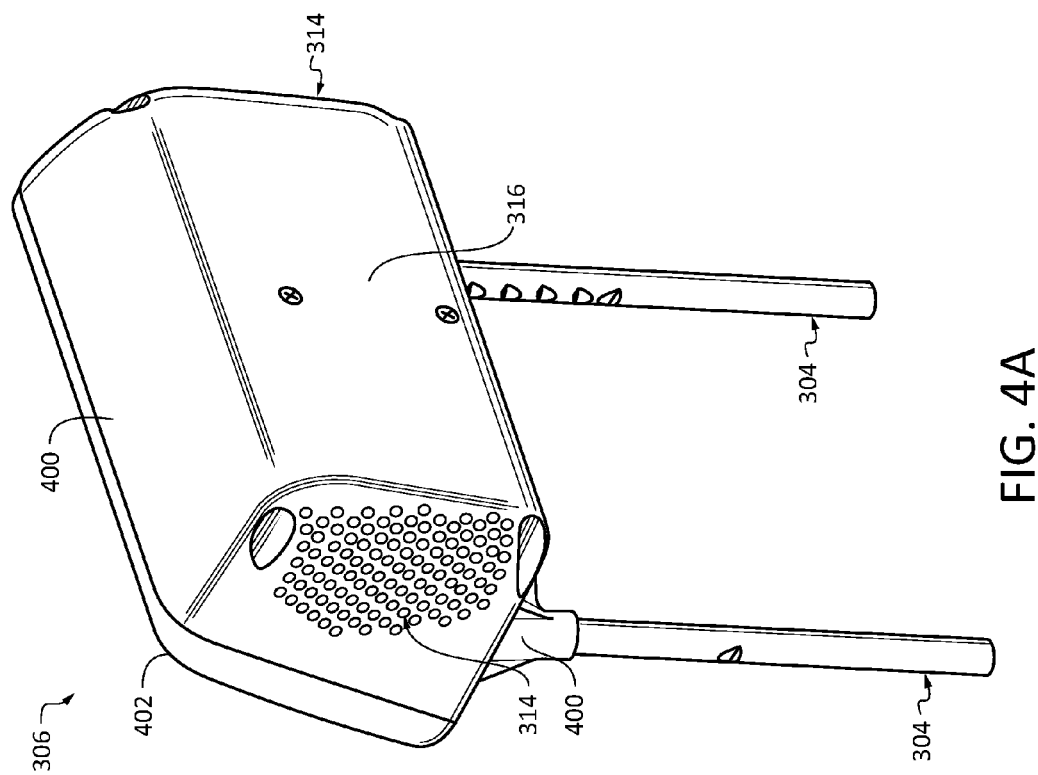
FIGS. 4A and 4B are front and back perspective views, respectively, of a core assembly from the automobile headrest of FIGS. 3A and 3B.
Figure 4B:
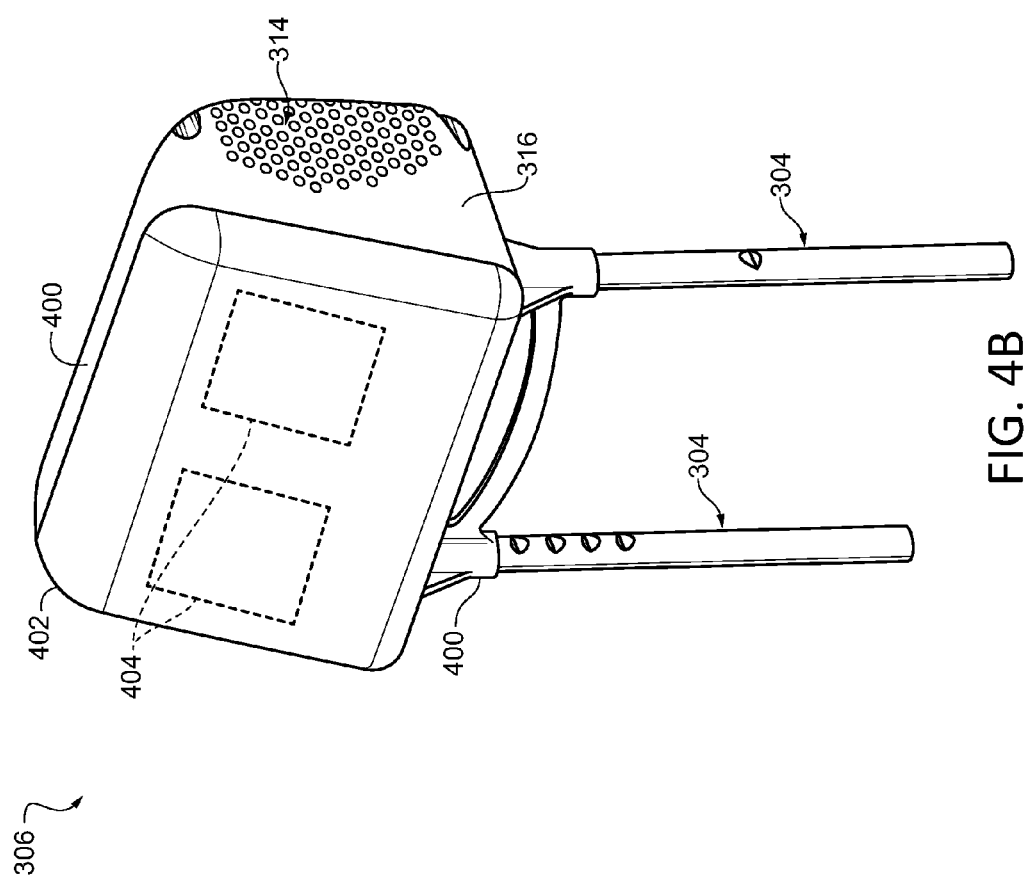

Referring to FIGS. 4A and 4B, in the illustrated example, the core assembly 306 is a three piece design that includes a core 400, a back cover 402, and the front cover 316. The core 400 receives and supports the speakers 308 (FIGS. 5A & 5B) and provides a rigid structural coupling between the support rods 304. The back cover 402 is secured to a back surface of the core 400 and assists in enclosing back portions of the speakers 308 to help provide sealed acoustic chambers 404.

The front cover 316 is secured to a front surface of the core 400 and assists in protecting the radiating surfaces of the speakers 308. The front cover 316 defines the grille openings 314 for the speakers 308 which allow acoustic energy from the speakers 308 to pass through the front cover 316.

The front and back covers 316, 402 can be shaped to meet various contours thereby allowing the headrest 300 to be adapted to meet various different contour shapes with a single structural core 400. This can beneficially allow manufacturers to build various different headrest types, e.g., to match the desired form and appearance of different car types, all with a common core 400.

Referring to FIGS. 5A and 5B, the core 400 is the main structural element of the headrest 300 and is designed to be exposed to a significant amount of stress. The core 400 includes ribbing 500 to help replicate the structural support that might otherwise be provided by a U-shaped portion of a traditional headrest support bar. The structural features (e.g., ribs 500 and/or walls 502) of the core 400, define side portions of acoustic chambers 404 for the speakers 308. The acoustic chambers 404 are sealed off with the back cover 402 which forms a back portion of the acoustic chambers 404. While the illustrated example includes two separate acoustic chambers (one for each speaker), in some implementations, the core 400 may alternatively be configured such that plural speakers share a common acoustic chamber. The core 400 also defines openings 504 which allow back portions of the speakers 308 to be inserted into the acoustic chambers 404. The core 400 can be formed from plastic, such as acrylonitrile butadiene styrene (ABS), polycarbonate (PC), or a polyphenylene ether (PPE)+polystyrene (PS) blend, in an injection molding process.

Each of the speakers 308 includes a drive unit 506 (e.g., a voice coil motor), a diaphragm 508, and a speaker frame 510 for supporting the drive unit 506 and the diaphragm 508. The speaker frames 510 mount straight to the core 400 with screws 512. The speakers 308 can be 2 inch to 3.1 inch diameter speakers. In some cases, the speakers may be arranged in pairs (e.g., pairs of 1 inch to 1.6 inch diameter speakers) on left and right sides. In some cases, the speakers may comprise oval speakers.

In some cases, wiring may be routed into the core 400 through one of the support rods 304. In some cases, one or more slots may be formed in the core 400 in order to pass electrical wiring into the acoustic chambers 404 for driving the speakers 308. Such slots can be sealed during assembly.

The core 400 also defines extensions 514 each of which defines a socket for receiving a distal end portion of one of the support rods 304. The distal end portions of the support rods 304 are pushed up into the sockets 516. The connection between the extensions 514 and the support rods 304 can be a friction fit. Alternatively or additionally, the extensions 514 and the support rods 304 can include interlocking features that help to secure the rods 304 within the sockets 516. The extensions 514 are configured to provide sufficient structural overlap with the support rods 304 such that impact forces that hit the headrest are transmitted into the bars. Furthermore, while an implementation has been described in which the sockets 516 are defined by the core 400, in some cases, the sockets may be formed separately from the core and subsequently secured thereto (e.g., via adhesive or hardware).

The back cover 402 seals off the backs of the core 400 from the left and the right so as seals off the back of the enclosure to provide two discrete, sealed acoustic chambers 404, and serves to provide the main body portion 302 with the desired back (rear) contour shape. The back cover 402 can be formed of molded plastic (e.g., polypropylene (PP), or acrylonitrile butadiene styrene (ABS)) and may be heat welded onto the core 400.

The front cover 316 serves to provide the main body portion 302 with the desired front contour shape. The front cover 316 defines the grille openings 314 and can be secured to the core 400 with screws 518. Alternatively or additionally, the front cover 316 can be secured to the core 400 via pressure sensitive adhesive (PSA) and/or heat staked bosses. The front cover 316 may be formed as a unitary molded plastic part. The front cover 316 may be formed of plastic such as polypropylene (PP), or acrylonitrile butadiene styrene (ABS)). In some cases, the material used to form the front and/or back cover can be selected to provide added structural rigidity or compliance. In some cases, the front cover 316 is a formed of a material having a Rockwell hardness (R scale) of about 80 to about 121.

Notably, the front cover 316 also defines a reaction plate 520. The reaction plate 520 is the region between the right and left sides of the front cover 316 and is configured to support a user's head and minimize hyper rotation of the user's head and neck (e.g., whiplash) in the event of relatively sudden automobile acceleration, for example as might occur in the case of a rear-end collision. Referring to FIG. 5B, the front cover 316 may include structural members (e.g., ribs 522) to help the front cover 316 meet the structural requirements of a headrest reaction plate.

Having the front cover 316 formed separately from the core 400 allows the reaction plate 520 to be oriented in a position that at least partially covers/overlaps the speakers (i.e., such that at least a portion of the speakers is disposed behind the reaction plate 520), thereby opening up more design space in the main body portion 302 for the speakers to be located (i.e., allowing the speakers to be pulled in towards the centerline of headrest 100).

In addition, forming the grille openings 314 and the reaction plate 520 in a unitary structure can allow the grille openings 314 to be located at least partially within the reaction plate 520. This can allow for greater flexibility in locating and shaping the grille openings 314, and the acoustically transparent regions formed by the grille openings 314, for achieving a desired radiation pattern.

Figure 6A:
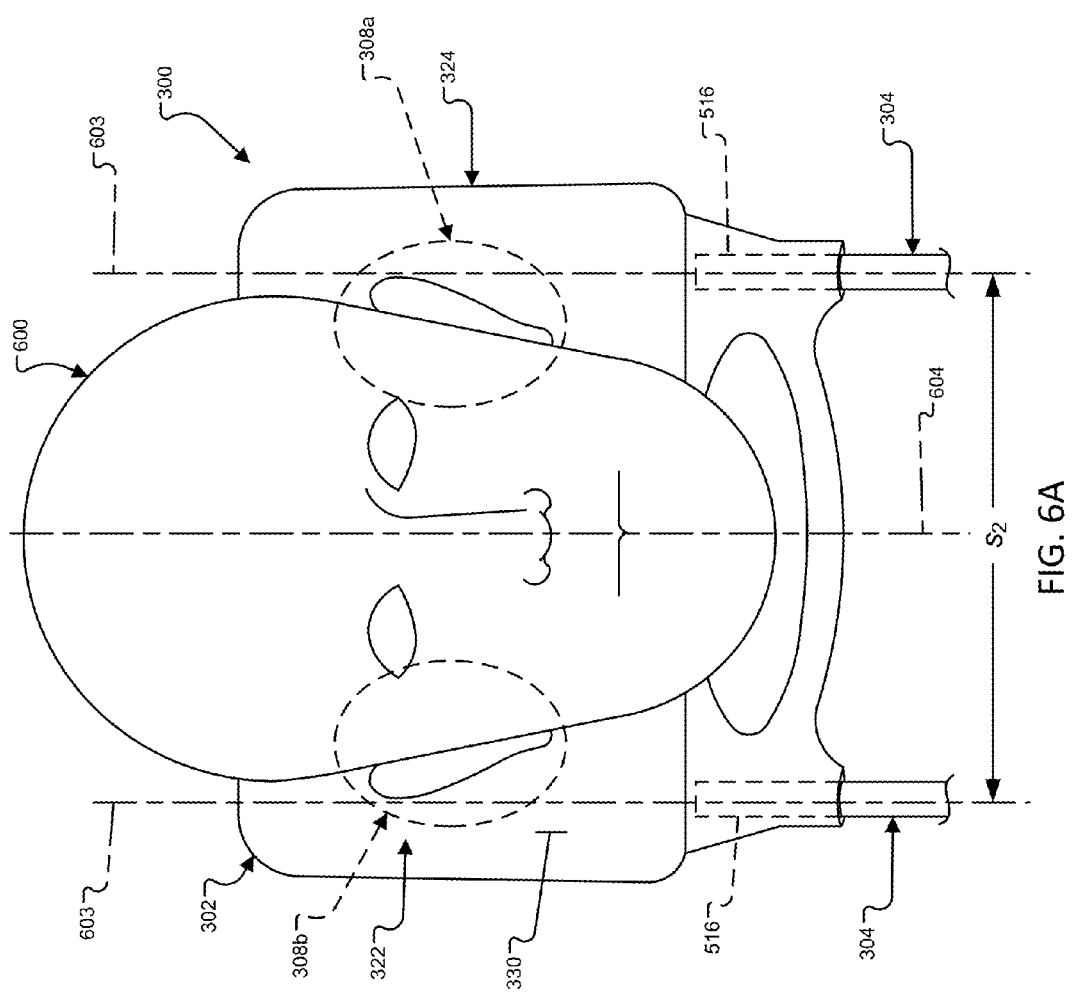
FIGS. 6A and 6B are front elevation and top plan views, respectively, of the automobile headrest of FIGS. 3A and 3B shown with a user's head.
Figure 6B:
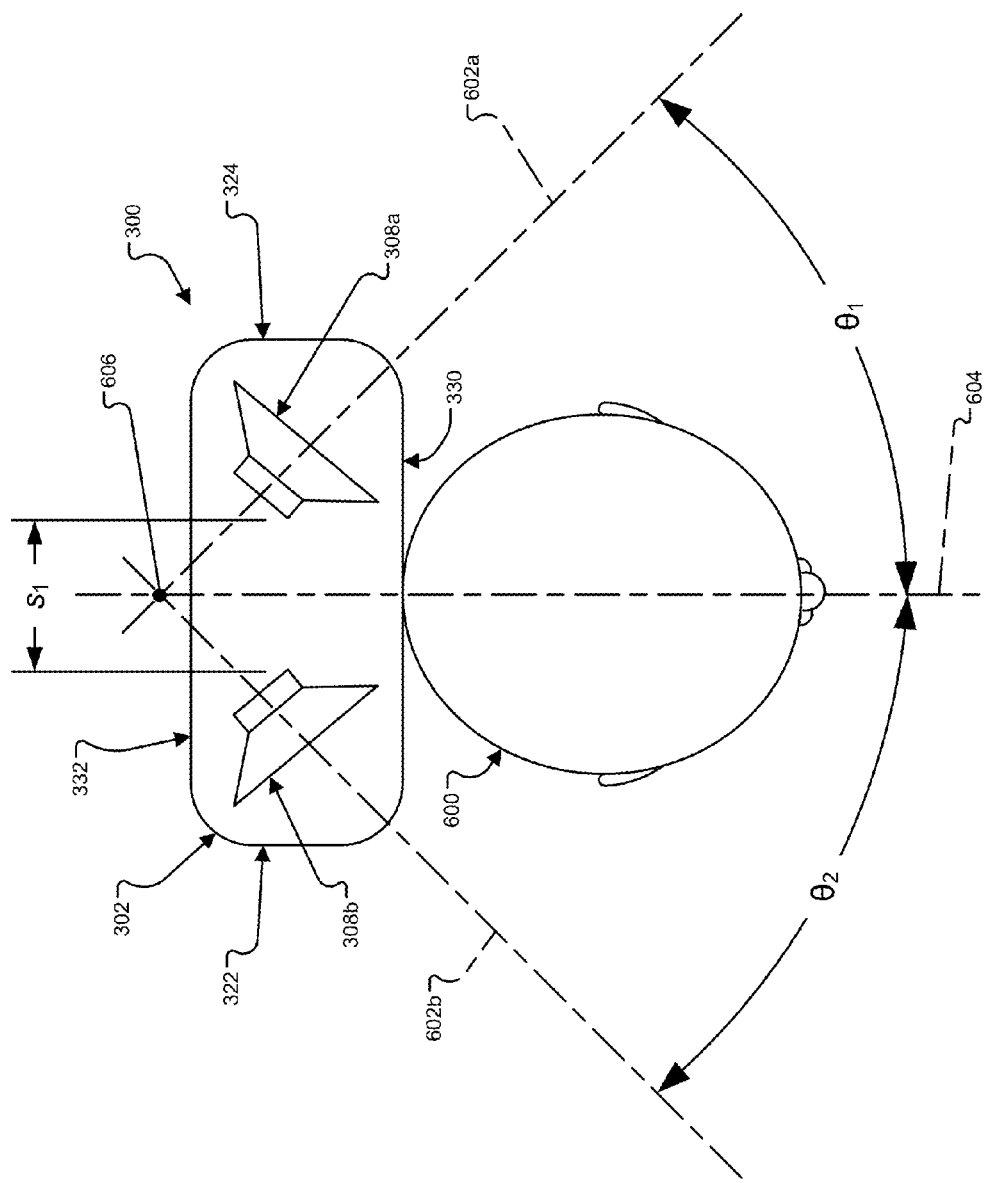

With reference to FIGS. 6A and 6B, the speakers 308 are arranged such that at least a portion of the speakers 308 is disposed directly behind a user's head 600 when the back of the user's head 600 rests against the front surface 330 of the main body portion 302 and is centered relative to main body portion 302. In some cases, the speakers 308 are arranged such that at least a portion of the speakers (i.e., at least 25% of the volume of the speakers 308, e.g., 40%-100% of the speaker volume) is disposed directly behind a user's head 600 when the back of the user's head rests against the front surface of the main body portion 302 and is centered relative to main body portion 302.

As used herein, "directly behind the user's head" is intended to mean not only behind a plane that is parallel to the back of the user's head, but also in a position that is within the breadth of the user's head 308 and between the top of the user's head and the user's chin, such that, when viewed from the front surface of the main body portion 302 (as in FIG. 6A), at least a portion (e.g., a substantial portion) of the speakers 308 lays within the footprint of the user's head 600 oriented with the back of the head resting against, and centered with respect to, the front surface of the main body portion.

For the purposes of this disclosure, the user is assumed to have an average adult size head. In that regard, an average adult size head has a breadth (i.e., the maximum breadth of the head, usually above and behind the ears) of about 5.2 inches to about 6.5 inches; and a measured menton to top of head (i.e., the vertical distance from the tip of the chin (menton) to the level of the top of the head, measured with a headboard) of about 7.8 inches to about 10.0 inches. The speakers may be arranged adjacent each other between right and left sides 322, 324 of the main body portion 302 and such that the minimum spacing $s_1$ between the speakers 308 is less than the breadth of an average adult sized head (i.e., less than about 5.2 inches to about 6.5 inches).

The speakers 308 may also be arranged such that at least a portion of the speakers 308 is disposed between longitudinal axes 603 about which the support rods 304 and the sockets 516 are concentrically arranged. In some cases, the speakers 308 are arranged such that a substantial portion of the speakers (i.e., at least 50% of the volume of the speakers 308, e.g., 75%-100% of the speaker volume) is disposed between the longitudinal axes 603. The longitudinal axes 603 are parallel and have a spacing $s_2$ of about 4.1 inches to about 6.0 inches.

Referring to FIG. 6B, the speakers 308 are arranged to direct acoustic energy from their front surfaces in diverging directions relative to one another. That is, the speakers 308 are each configured to radiate acoustic energy along a respective central axis 602a, 602b, and may be positioned such that their central axes 602a, 602b cross a vertical plane 604 (i.e., a vertical plane that bisects the headrest 300 and extends through the front and back surfaces 330, 332 of the main body portion 302) at a point, or at respective points, behind the front surface of the main body portion 302. In some cases, the central axes may cross the vertical plane 604 at a point, or respective points, located between the front and back surfaces 330, 332 of the main body portion 302. In certain cases, the central axes 602a, 602b of the speakers 308 may cross the vertical plane 604 at a point 606, or at respective points, behind the back surface 332 of the main body portion 302.

In some cases, the speakers 308 are positioned such that their central axes 602a, 602b diverge at respective angles $\theta_1$, $\theta_2$ of about 5 degrees to about 60 degrees (e.g., about 45 degrees) relative to the vertical plane 604. In some cases, the speakers 308 may be substantially symmetrical about the vertical plane 604.

Positioning the left and right speaker 308a, 308b so as to direct acoustic energy in diverging directions relative to one another helps in creating a discrete sound coming out of each speaker 308, and helps to ensure that the discrete sound coming out of the left speaker 308a does not cross-over to the right ear, and the discrete sound coming out the right speaker 308b does not cross-over to the left ear.

While implementations have been described in which the speakers are arranged to direct acoustic energy from their front surfaces in diverging directions, in some cases, the left and right speakers may be configured to direct acoustic energy along respective central axes that are substantially parallel to each other.

A number of implementations have been described. Nevertheless, it will be understood that additional modifications may be made without departing from the scope of the inventive concepts described herein, and, accordingly, other embodiments are within the scope of the following claims.

What is claimed is:

1. An automobile headrest comprising:
   A.) a main body portion comprising:
      i.) first and second speakers disposed within the main body portion,
      ii.) a core configured to support the speakers, and
      iii.) a front cover formed as a one piece molded plastic part, the front cover defining a reaction plate that is arranged to support a back of a head of a user, wherein the reaction plate is configured such that at least a portion of the speakers is disposed behind the reaction plate and directly behind the head of the user when the back of the head of the user rests against the reaction plate and is centered relative to the main body portion; and
   B.) a pair of support rods connected to the core,
      wherein the core defines a portion of one or more acoustic chambers for the first and second speakers.

2. The automobile headrest of claim 1, wherein the speakers are each configured to radiate acoustic energy along a respective central axis, and wherein the speakers are positioned such that their central axes do not cross a vertical plane at any point forward of the front surface of the main body portion, and
   wherein the vertical plane bisects the headrest and extends through the front surface and an opposing, back surface of the main body portion.

3. The automobile headrest of claim 1, wherein the speakers are arranged so as to direct acoustic energy in diverging directions, relative to each other, forward of the front surface.

4. The automobile headrest of claim 1, wherein the speakers are positioned such that their central axes diverge at respective angles of about 5 degrees to about 60 degrees relative to a vertical plane,
   wherein the vertical plane bisects the headrest and extends through the front surface and an opposing, back surface of the main body portion.

5. The automobile headrest of claim 4, wherein the speakers are positioned such that their central axes diverge at respective angles of about 45 degrees relative to the vertical plane.

6. The automobile headrest of claim 1, wherein the speakers are each configured to radiate acoustic energy along a respective central axis, and wherein the speakers are positioned such that their central axes are substantially parallel.

7. The automobile headrest of claim 1, wherein the speakers are arranged adjacent each other between right and left sides of the main body portion, and wherein the main body portion has a width, measured between the left and right sides, of about 7.9 inches to about 11.4 inches.

8. The automobile headrest of claim 7, wherein the main body portion has a width of 8.5 inches to 9.6 inches.

9. The automobile headrest of claim 1, wherein the core is configured to support the speakers such that the speakers are at least partially disposed between a pair of longitudinal axes about which the support rods are arranged.

10. The automobile headrest of claim 7, wherein the longitudinal axes of the support rods are spaced about 4.1 inches to about 6.0 inches apart.

11. The automobile headrest of claim 1, wherein the core defines a plurality of ribs.

12. The automobile headrest of claim 1, wherein the speakers are positioned symmetrically about a vertical plane that bisects the headrest and extends through the front surface and an opposing, back surface of the main body portion.

13. The automobile headrest of claim 1, wherein the core is a one piece molded plastic part.

14. The automobile headrest of claim 1, wherein the main body portion comprises a back cover connected to the core, and wherein the back cover and the core together define the one or more acoustic chambers.

15. The automobile headrest of claim 14, wherein the one or more acoustic chambers comprise a plurality of acoustic chambers, and wherein the main body portion and the back cover together define the plurality of acoustic chambers.

16. The automobile headrest of claim 14, wherein the back cover is welded to the core.

17. The automobile headrest of claim 1, wherein the front cover further defines grille openings for the speakers.

18. The automobile headrest of claim 17, wherein at least some of grille openings are formed in the reaction plate.

19. The automobile headrest of claim 1, wherein the reaction plate is configured to minimize hyper rotation of the user's head and neck in the event of relatively sudden automobile acceleration.

20. The automobile headrest of claim 1, wherein the core defines a pair of sockets each for receiving a distal end portion of one of the support rods.

21. The automobile headrest of claim 1, wherein the front cover is formed of a material having a Rockwell hardness (R scale) of about 80 to about 121.

22. The automobile headrest of claim 1, wherein the front cover comprises ribs to provide structural support for the reaction plate.

23. An automobile headrest comprising:
   A.) a main body portion comprising:
      i.) a core assembly comprising:
         a.) first and second speakers disposed within the main body portion,
         b.) a core configured to support the speakers,
         c.) a back cover connected to the core, and
         d.) a front cover formed as a one piece molded part, connected to the core, and defining grille openings and a reaction plate that is arranged to support a back of a head of a user, wherein the reaction plate is configured such that at least a portion of the speakers is disposed behind the reaction plate and directly behind the head of the user when the back of the head of the user rests against the reaction plate and is centered relative to the main body portion; and
   B.) a pair of support rods connected to the core, wherein the back cover and the core together define one or more acoustic chambers for the speakers.

24. The automobile headrest of claim 23, wherein the back cover defines a contour of a back surface, opposite the front surface, of the main body portion.

25. The automobile headrest of claim 23, wherein the front cover defines a contour of the front surface of the main body portion.

26. The automobile headrest of claim 23, further comprising a cushion layer enveloping the core assembly, and a cover layer enveloping the cushion layer.

27. The automobile headrest of claim 26, wherein the cushion layer includes a first region of relatively higher acoustic dampening, and a second region of relatively lower acoustic damping disposed in a region of the grille openings.

28. The automobile headrest of claim 23, wherein the core defines a pair of sockets each for receiving a distal end portion of one of the support rods.

29. The automobile headrest of claim 23, wherein the reaction plate is configured to minimize hyper rotation of the user's head and neck in the event of relatively sudden automobile acceleration.

30. The automobile headrest of claim 23, wherein at least some of grille openings are formed in the reaction plate.

31. An automobile headrest comprising:
   a main body portion comprising:
      i.) first and second speakers disposed within the main body portion,
      ii.) a unitary core having a front surface, wherein the core at least partially defines one or more acoustic chambers for the speakers, and wherein the core defines a pair of sockets each for receiving a distal end portion of a support rod, and
      iii.) a front cover formed as a one piece molded plastic part and secured to the front surface of the core, the front cover defining a reaction plate that is configured such that at least a portion of the speakers is disposed behind the reaction plate, between a pair of longitudinal axes about which the sockets are arranged, and directly behind the head of the user when the back of the head of the user rests against the front cover and is centered relative to the main body portion.

* * * * *